United States Patent
Hanscom et al.

(10) Patent No.: US 11,304,409 B2
(45) Date of Patent: Apr. 19, 2022

(54) MURDER HORNET EXCLUDER

(71) Applicants: Martin Hanscom, Carlsbad, CA (US); Eric Hanscom, Carlsbad, CA (US)

(72) Inventors: Martin Hanscom, Carlsbad, CA (US); Eric Hanscom, Carlsbad, CA (US)

( * ) Notice: Subject to any disclaimer, the term of this patent is extended or adjusted under 35 U.S.C. 154(b) by 67 days.

(21) Appl. No.: 16/913,667

(22) Filed: Jun. 26, 2020

(65) Prior Publication Data

US 2021/0400924 A1    Dec. 30, 2021

(51) Int. Cl.
*A01K 47/06*    (2006.01)
*A01M 29/34*    (2011.01)

(52) U.S. Cl.
CPC .............. *A01K 47/06* (2013.01); *A01M 29/34* (2013.01)

(58) Field of Classification Search
CPC ........ A01K 47/06; A01K 47/00; A01M 29/34
See application file for complete search history.

(56) References Cited

FOREIGN PATENT DOCUMENTS

| CN | 104335923 A | * | 2/2015 | ............ A01K 47/06 |
|---|---|---|---|---|
| CN | 106035138 A | * | 10/2016 | ............ A01K 47/06 |
| EP | 3597036 A1 | * | 1/2020 | ............ A01K 47/06 |
| ES | 2611500 A1 | * | 5/2017 | ............ A01M 23/08 |
| JP | 2014100133 A | * | 6/2014 | ............ A01M 29/34 |
| JP | 3203946 U | * | 4/2016 | ............ A01M 29/34 |
| JP | 3208543 U | * | 1/2017 | ............ A01K 47/06 |
| JP | 2018046767 A | * | 3/2018 | ............ A01K 47/06 |
| KR | 200343501 Y1 | * | 3/2004 | ............ A01K 47/06 |
| KR | 200405159 Y1 | * | 1/2006 | ............ A01K 51/00 |
| KR | 101833247 B1 | * | 3/2018 | ............ A01K 47/06 |
| KR | 20180045177 A | * | 5/2018 | ............ A01K 47/06 |
| WO | WO-2008063540 A1 | * | 5/2008 | ............ A01M 29/34 |
| WO | WO-2016195048 A1 | * | 12/2016 | ............ A01M 29/34 |

\* cited by examiner

*Primary Examiner* — Kathleen I Alker
(74) *Attorney, Agent, or Firm* — Eric Hanscom

(57) ABSTRACT

A Murder Hornet excluder is described. The excluder is made from a mesh that has openings large enough to let both queen and worker bees in and out, but too small to allow the much larger hornets to invade. It has a stepped top, two sides and a bottom that "wrap around" the entrance to a beehive. The stepped top extends the front several inches in front of the opening to the hive to give honeybees a "safe cage", with adequate room to begin flight and descend after passing through the excluder. In a preferred embodiment, the mesh is between 6 mm and 10 mm on a side.

6 Claims, 7 Drawing Sheets

MURDER HORNET EXCLUDER

CROSS REFERENCE TO RELATED APPLICATIONS

None

STATEMENT REGARDING FEDERALLY SPONSORED RESEARCH OR DEVELOPMENT

This invention was not federally sponsored.

BACKGROUND OF THE INVENTION

Field of the Invention

This invention relates to the general field of beekeeping devices, and more specifically, to an excluder that can be mounted at the front of a beehive with a mesh sized to allow honeybees to pass through easily but to exclude larger wasps such as the Asian Giant Hornet, or Murder Hornet as it is better known.

Brief Description of Invention

The Murder Hornet Excluder is a pre-cut, flat sheet of mesh, preferably mesh wire, that has been folded into a shape that effectively covers the entrance to a beehive and selectively allows in only insects smaller than the mesh will allow. The device is specifically aimed at excluding Murder Hornets and other large wasps that may feed on honeybee honey or larvae.

The Asian Giant Horner, or Murder Hornet, is a large hornet native to parts of Japan and China. Among its food sources are honeybee larvae. To gather the larvae and return them to the Murder Hornet next, Murder Hornet scouts locate a beehive and mark it with pheromones. Should the scout make it back to the Murder Hornet nest, it will signal the other hornets that a beehive has been located and a hornet raiding party will follow the scout back to the hive. The Murder Hornets then kill any honeybee that tries to defend the hive, thereby wiping out the beehive, before taking the honeybee larvae back to the hornet nest to feed their young.

In their native Japan, honeybees have developed a defensive mechanism of swarming the Murder Hornet scout and, through rapid vibration, raise the temperature above what the hornets can tolerate, thereby "roasting" the hornet alive. It is not known how long it took for the Japanese honeybees to develop this defensive mechanism, but it is known that the European honeybee (which is also the prevalent species in the United States), does not have this defense to the Murder Hornets. Since it is estimated the honeybees contribute approximately 20 billion dollars a year to the US economy from their pollinating activities, protecting honeybees in the United States is extremely important.

The first Murder Hornets were discovered in the Pacific Northwest in 2019. Since then, several other dead hornets have been found in the area, causing great concern that colonies of Murder Hornets have become established and will begin to wreak havoc on the beehives of European honeybees that have not developed any defenses against the hornets. Thus, there is a serious economic need for a device that can protect beehives from attacks by Murder Hornets.

The current invention provides just such a solution by having a Murder Hornet excluder made from a mesh that has openings large enough to let both queen and worker bees in and out, but too small to allow the much larger hornets to invade. It has a stepped top, two sides and a bottom that "wrap around" the entrance to a beehive. The stepped top extends the front several inches in front of the opening to the hive to create a "safe cage", which gives honeybees adequate room to begin flight and descend after passing through the excluder. In a preferred embodiment, the mesh is a square mesh, with square openings between 6 mm and 10 mm on a side.

OBJECTS OF THE INVENTION

It is therefore an object of the present invention to provide a mesh excluder capable of allowing honeybee workers and queens to pass through but excluding Murder Hornets.

There has thus been outlined, rather broadly, the more important features of the invention in order that the detailed description thereof may be better understood, and in order that the present contribution to the art may be better appreciated. There are additional features of the invention that will be described hereinafter, and which will form the subject matter of the claims appended hereto. The features listed herein, and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

It should be understood the while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

BRIEF DESCRIPTION OF THE FIGURES

One preferred form of the invention will now be described with reference to the accompanying drawings.

DETAILED DESCRIPTION OF THE FIGURES

Figure 1:
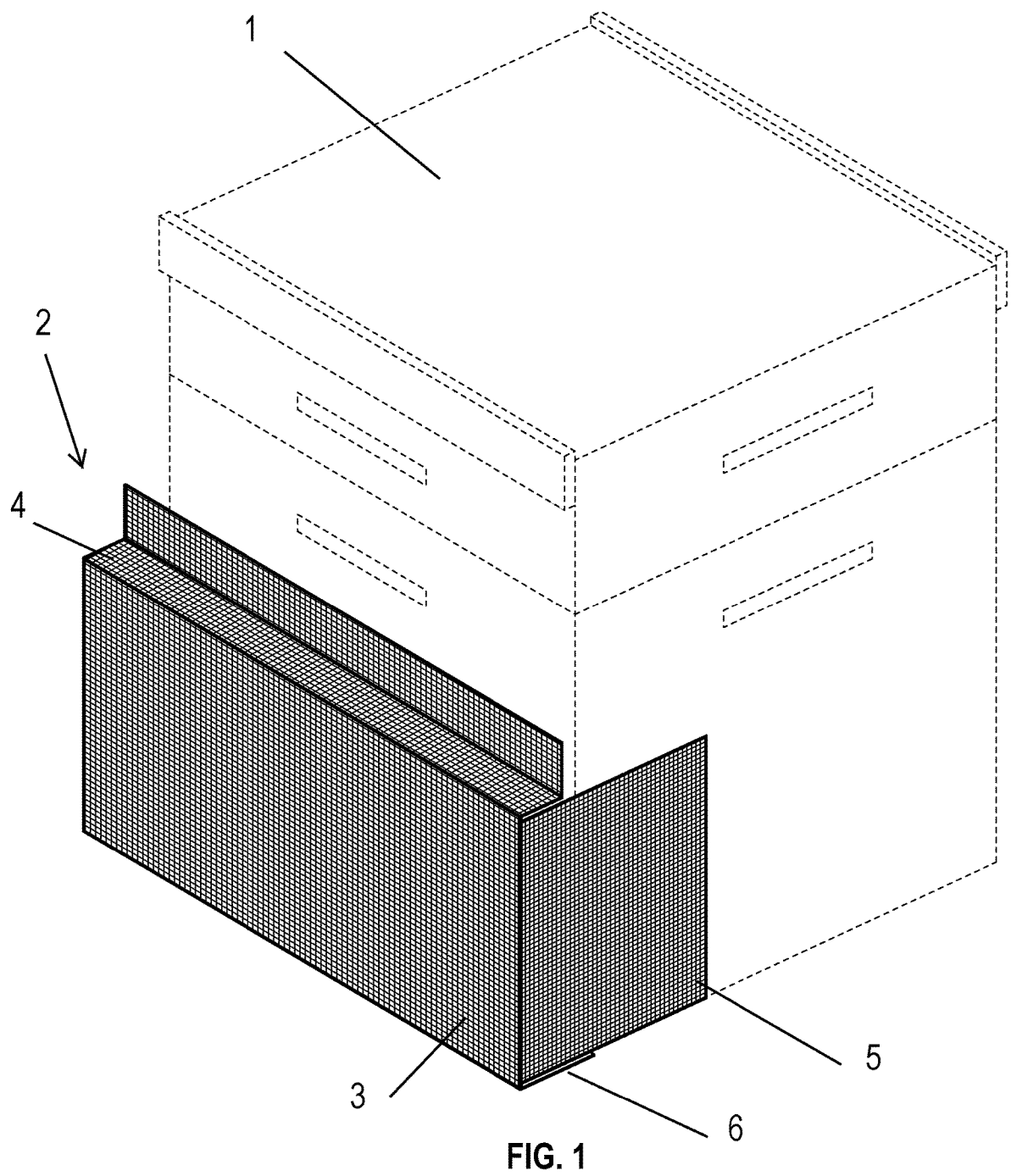
FIG. 1 is a perspective view of a Murder Hornet excluder on a beehive, according to a preferred form of the invention.

Many aspects of the invention can be better understood with references made to the drawings below. The components in the drawings are not necessarily drawn to scale. Instead, emphasis is placed upon clearly illustrating the components of the present invention. Moreover, like reference numerals designate corresponding parts through the several views in the drawings. Before explaining at least one embodiment of the invention, it is to be understood that the embodiments of the invention are not limited in their application to the details of construction and to the arrangement of the components set forth in the following description or illustrated in the drawings. The embodiments of the invention are capable of being practiced and carried out in various ways. In addition, the phraseology and terminology employed herein are for the purpose of description and should not be regarded as limiting.

FIG. 1 is a perspective view of a Murder Hornet excluder, generally 2, on a beehive 1, according to a preferred form of the invention. The beehive 1 has an entrance (not visible in this figure) which is a small slit at the bottom of the hive. It is through this slit that the honeybees go out to gather pollen, and that queen bees will sometimes leave when they take some of the worker bees with them to start a new hive. This entrance is also the entrance through which the Murder Hornets invade to decimate the hive and take the honeybee larvae to fee their hornet offspring.

The excluder has a front 3, two sides 5 that wrap around the sides of the beehive, and a bottom 6 that wraps under the beehive 1. A step 4, provides spacing between the front 3 and the entrance, giving the honeybees plenty of areas to enter and exit the excluder. The step 4 also creates a "safe cage" (bounded by the front of the beehive, and the top, sides, bottom and front of the invention), in which they can begin their flight, end their flight, and perform hive maintenance functions such as removing dead insects and cooling the hive without danger of attack from hornets.

Honeybees are slightly under 4 mm in width, and honeybee queens are around 6 mm in width. Asian Giant Hornets, on the other hand, are around 12 mm wide, so about twice as wide as the average honeybee queen. Thus, just as a "queen excluder" with mesh around 4 mm on a side is used between levels of a beehive, so a "Murder Hornet excluder with mesh larger than the 6 mm honeybee queens and smaller than the 12 mm hornets will effectively keep the hornets out of the hive.

A queen excluder is a flat piece of metal with 4 mm holes or slits in it and prevents the queen from moving to certain regions of the hive to lay her eggs. In these areas without eggs, the bees store honey, making it easy for the beekeeper to lift out the frames and remove the honey, without having to separate the honeycomb cells with bee larvae and honey from each other.

However, the Murder Hornet Excluder serves an additional purpose other than keeping one size of insect out of an enclosed area. The queen excluder merely serves as a physical barrier to the queen as she walks around the hive looking for places to lay her eggs. For bees entering or exiting the entrance, however, putting a physical barrier right up against the entrance would delay bees from effectively entering and exiting the hive. It would also impede the cooling function that occurs when the hive is hot, and worker bees use their wings to fan in cool, outside air. Lastly, having a very small entrance would make it very easy for Murder Hornets to just wait at the entrance and pick off bees coming in or going out (even though it is the honeybee larvae that Murder Hornets are mainly after, they will capture and eat honeybees as well).

Thus, because the step 4 gives some spaced between the front 3 and the entrance, a "safe cage" is created around the entrance such that the honeybees exiting the entrance can begin to fly in the safe cage, then pick their exit through the mesh at an area not being guarded by a predator. Likewise, for a worker bee returning from gathering pollen, she can pick an area without predators and neatly fly through the hole, or even land briefly and the mesh, rotate her wings through the mesh, then fly to the entrance.

In terms of the excluder, it is contemplated that standard wire mesh or plastic mesh would work. Metal mesh is preferred as it could easily be bent to the desired final shape and not lose its form over time. The excluder could be secured to the beehive with screws, nails, or even thumbtacks.

With respect to the openings in the mesh, honeybees are approximately 4 mm in width, with honeybee queens around 6 mm in width. Murder Hornets, on the other hand, are around 12 mm in width, giving the excluder an effective mesh size of anything from slightly above 6 mm on a side to 10 or 11 mm on a side. While wire mesh with square holes is a preferred embodiment, it is also contemplated that material with round holes could also be effectively used, so long as the holes had a diameter greater than the width of a honeybee or a honeybee queen, and smaller than the width of a Murder Hornet.

Figure 2:
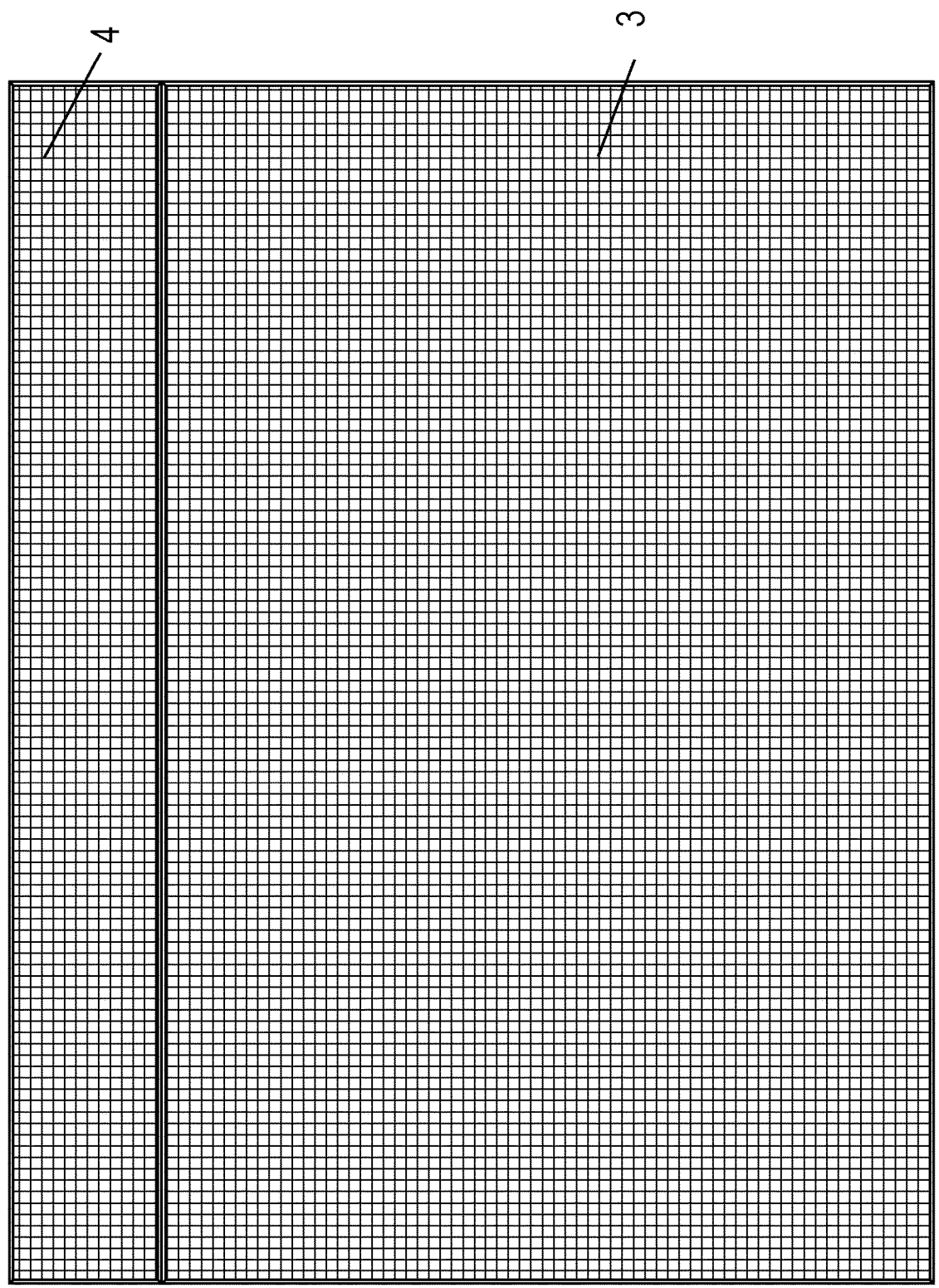
FIG. 2 is a front view of the excluder.

FIG. 2 is a front view of the excluder, showing the front 3 and the step 4.

Figure 3:
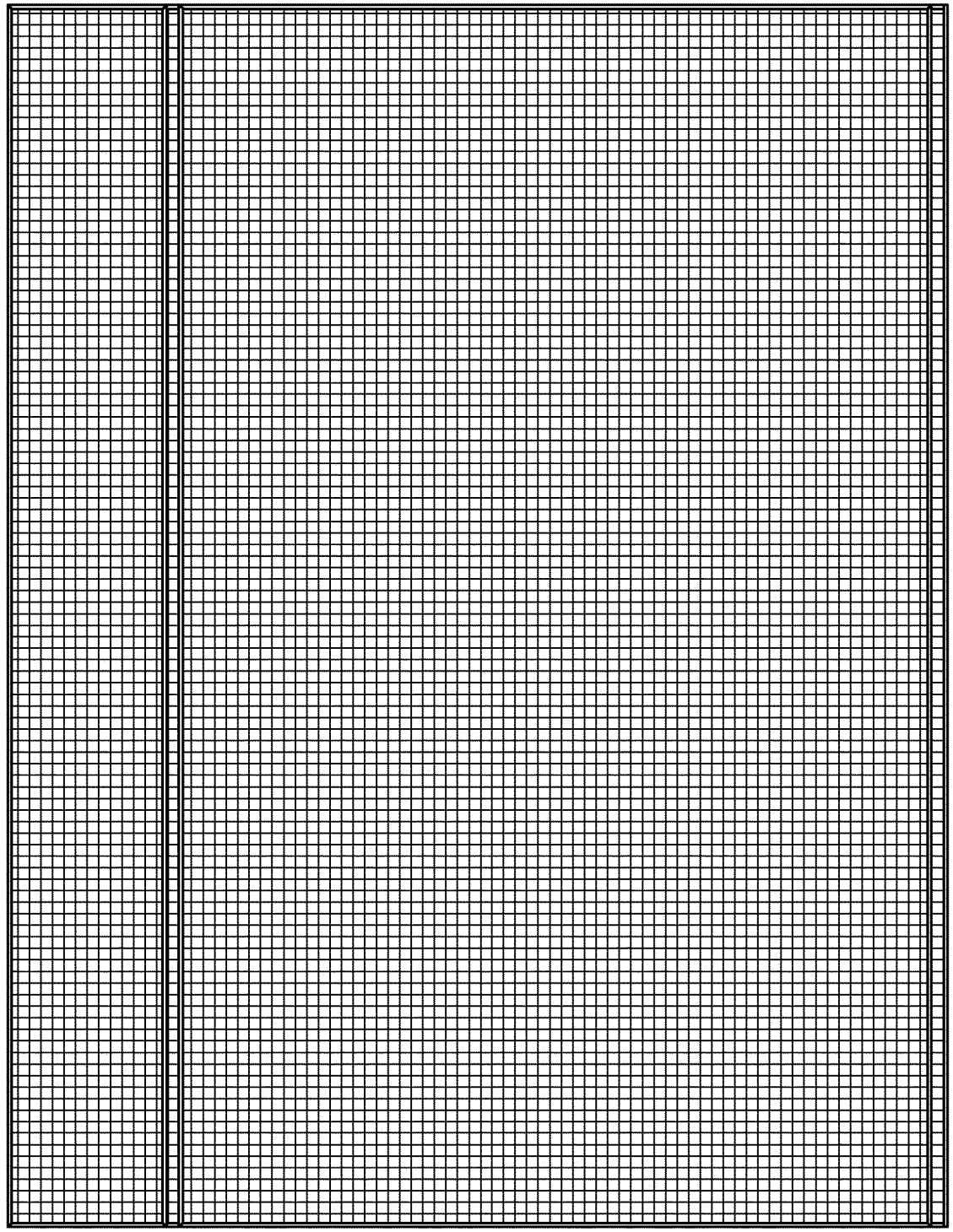
FIG. 3 is a back view of the excluder.

FIG. 3 is a back view of the excluder.

Figure 4:
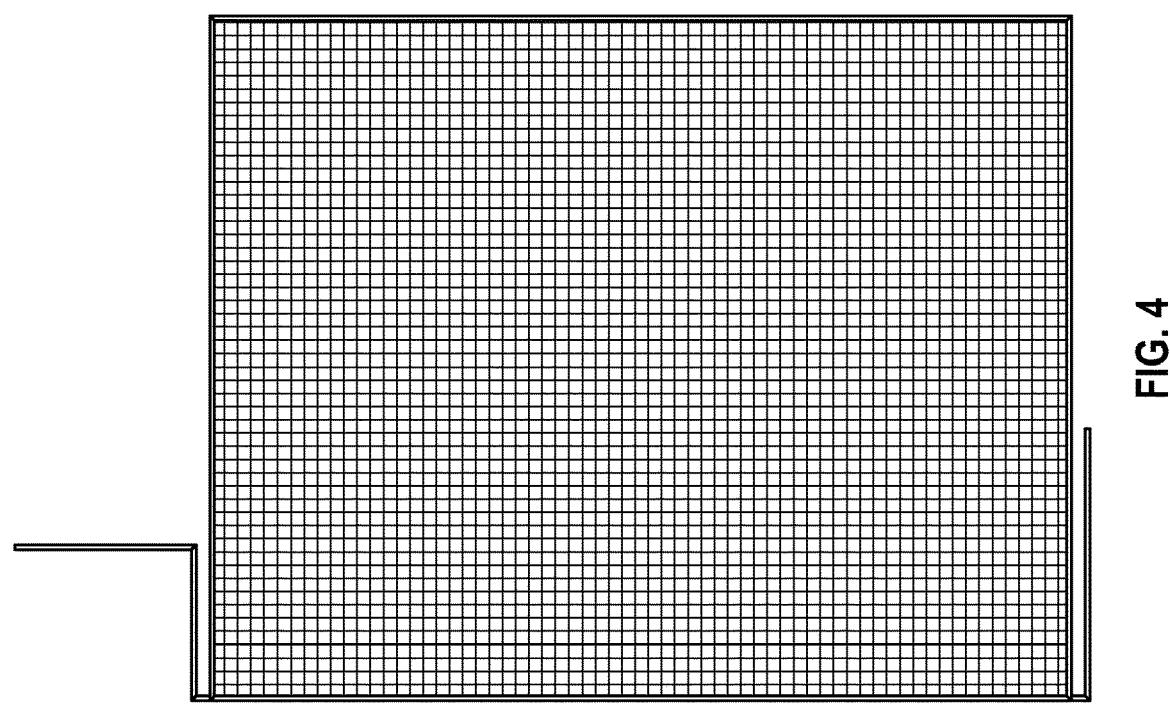
FIG. 4 is a right-side view.

FIG. 4 is a right-side view showing the bottom 6, the side 5 and the step 4.

Figure 5:
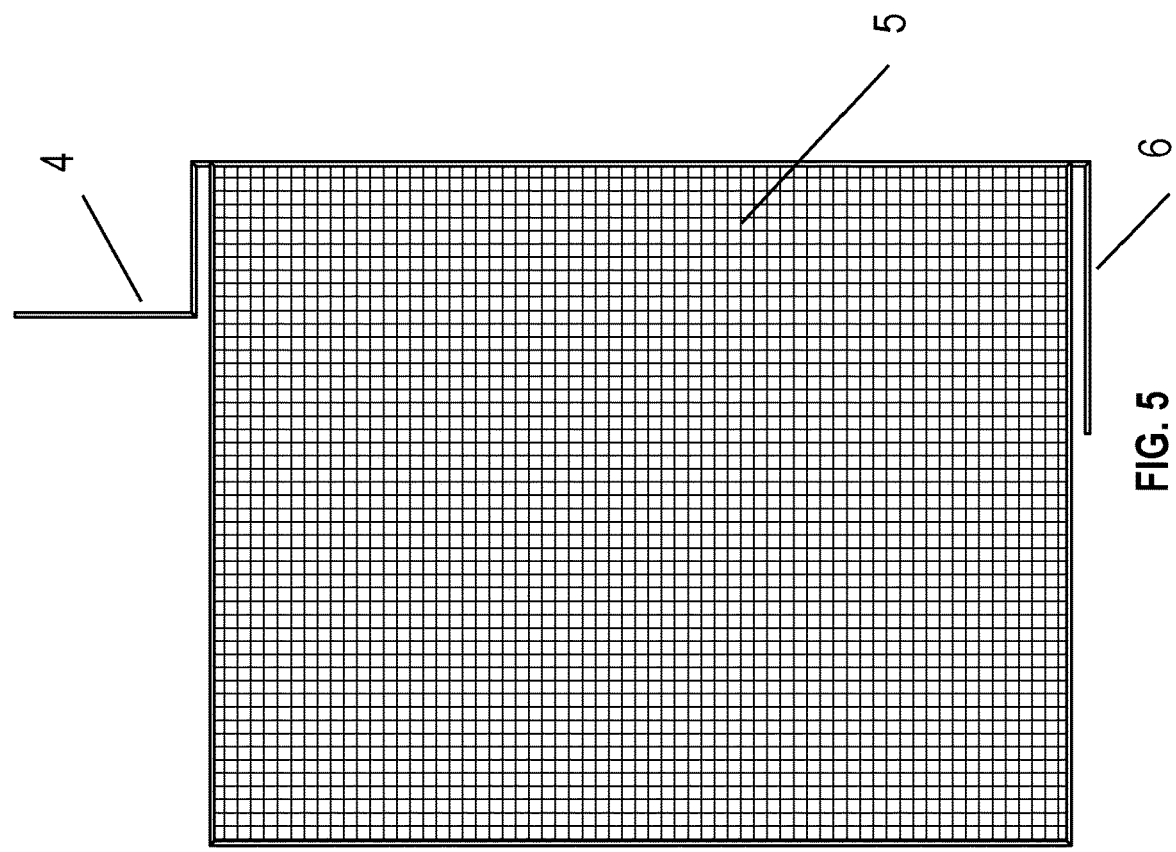
FIG. 5 is a left-side view.

FIG. 5 is a left-side view.

Figure 6:
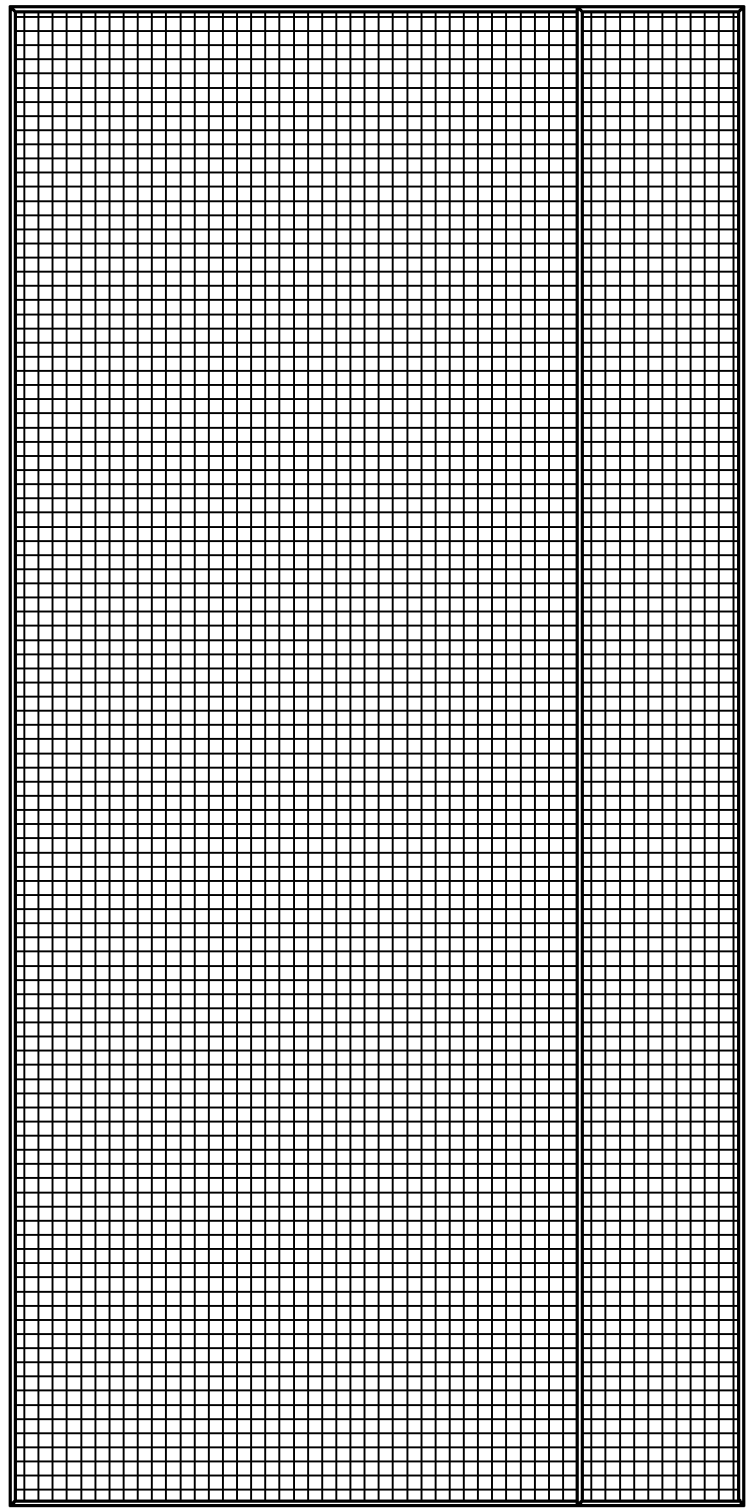
FIG. 6 is a top view.

FIG. 6 is a top view.

Figure 7:
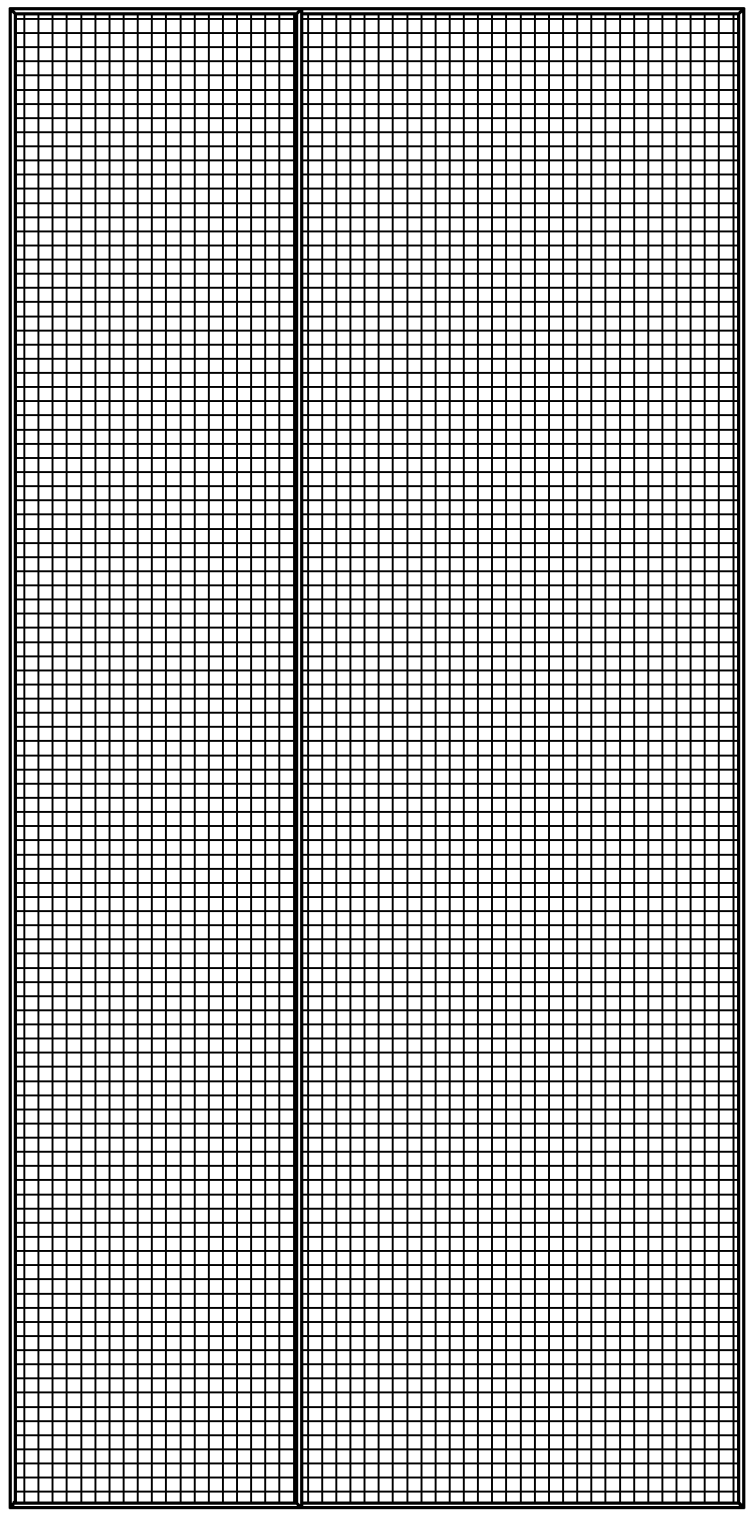
FIG. 7 is a bottom view.
Figure 8:
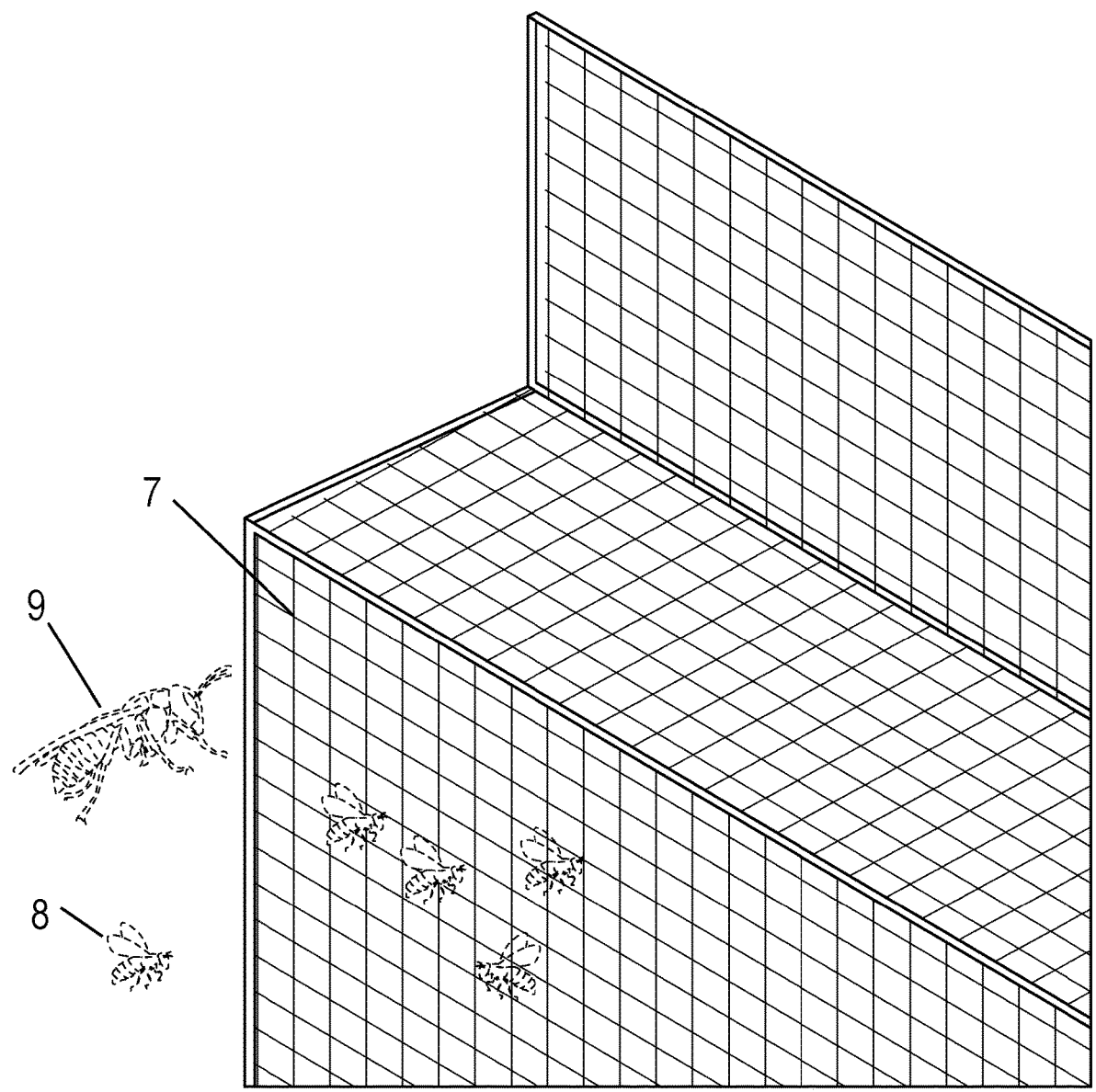
FIG. 8 is a perspective, close-up view thereof showing how the honeybees can pass freely through the mesh, while a Murder Hornet cannot.

FIG. 7 is a bottom view,

FIG. 8 is a perspective, close-up view thereof showing how the honeybees 8 can pass freely through the mesh 7, while a Murder Hornet 9 cannot.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

REFERENCE NUMBERS USED

1. Beehive
2. Murder Hornet Excluder
3. Front
4. Step
5. Side
6. Bottom
7. Mesh
8. Honeybee
9. Murder Hornet That which is claimed:

1. A device for excluding murder hornets from beehives, comprising:
   a front, two sides, a bottom and a step, where the front, the two sides, the bottom and the step each comprises a metal mesh,
   in use where the two sides wrap around two sides of a beehive, where the bottom wraps under a bottom of the beehive, and where the step creates a safe cage between an entrance to the beehive, the front, the bottom, and the two sides,
   where the mesh comprises a plurality of vertical members and a plurality of horizontal members, where the plurality of vertical members are equally spaced and where the plurality of horizontal members are equally spaced, where an intersection of two sequential vertical members and two sequential horizontal members creates a square opening, and where the square opening has a square height and a square width, and where the square height is between 7 and 11 mm, and where the square width is between 7 and 11 mm, such that a honeybee worker or a honeybee queen can pass through the square opening but a murder hornet cannot pass through the square opening, in use where the safe cage comprises an area bounded by the front, the two sides, the bottom, the step, and a front of the beehive.

2. A device for excluding murder hornet from beehives, consisting of:

a front, two sides, a bottom and a step, where the front, the two sides, the bottom and the step each comprises a mesh material, in use where the two sides wrap around two sides of a beehive, where the bottom wraps under a bottom of the beehive, and where the step creates a safe cage between an entrance to the beehive and the front, where the mesh material comprises a plurality of vertical members and a plurality of horizontal members, where the plurality of vertical members are equally spaced and where the plurality of horizontal members are equally spaced, where an intersection of two sequential vertical members and two sequential horizontal members creates a square opening, and where the square opening has a square height and a square width, where the square height is between 7 and 11 mm, and where the square width is between 7 and 11 mm, such that a honeybee worker or a honeybee queen can pass through the square opening but a murder hornet cannot pass through the square opening, in use where the safe cage comprises an area bounded by the front, the two sides, the bottom, the step, and a front of the beehive.

3. The device of claim 2, where the square height is between 8 and 10 mm, and where the square width is between 8 and 10 mm.

4. The device of claim 2, where the square height is between 9 and 10 mm, and where the square width is between 9 and 10 mm.

5. The device of claim 2, where the mesh material is wire mesh.

6. The device of claim 2, where the mesh material is plastic mesh.

* * * * *